(12) United States Patent
Rabinowitz (10) Patent No.: US 6,988,809 B2
(45) Date of Patent: Jan. 24, 2006

(54) ADVANCED MICRO-OPTICS SOLAR ENERGY COLLECTION SYSTEM

(76) Inventor: Mario Rabinowitz, 715 Lakemead Way, Redwood City, CA (US) 94062

( * ) Notice: Subject to any disclaimer, the term of this patent is extended or adjusted under 35 U.S.C. 154(b) by 219 days.

(21) Appl. No.: 10/760,068

(22) Filed: Jan. 16, 2004

(65) Prior Publication Data
US 2005/0157411 A1 Jul. 21, 2005

(51) Int. Cl.
*G02B 7/182* (2006.01)

(52) U.S. Cl. .............. 359/851; 359/853; 359/873; 359/872

(58) Field of Classification Search ........... 359/851, 359/853, 873, 872, 296, 220, 221, 223, 224, 359/225, 226, 290; 126/600, 684; 345/107
See application file for complete search history.

(56) References Cited

U.S. PATENT DOCUMENTS

| | | | |
|---|---|---|---|
| 3,670,323 A | 6/1972 | Sobel et al. ............ 345/107 |
| 4,261,653 A | 4/1981 | Goodrich ............ 359/296 |
| 5,498,297 A * | 3/1996 | O'Neill et al. ............ 136/246 |
| 5,717,515 A | 2/1998 | Sheridon ............ 359/296 |
| 5,754,332 A | 5/1998 | Crowley ............ 359/296 |
| 5,808,783 A | 9/1998 | Crowley ............ 359/296 |
| 5,815,306 A * | 9/1998 | Sheridon et al. ............ 359/296 |
| 5,914,805 A | 6/1999 | Crowley ............ 359/296 |
| 6,197,228 B1 | 3/2001 | Sheridon ............ 264/136 |
| 6,211,998 B1 | 4/2001 | Sheridon ............ 359/296 |
| 6,222,513 B1 | 4/2001 | Howard et al. ............ 345/84 |
| 6,227,673 B1 * | 5/2001 | O'Hara-Smith ............ 359/850 |
| 6,243,058 B1 | 6/2001 | Mikkelsen et al. ............ 345/84 |
| 6,262,707 B1 | 7/2001 | Sheridon ............ 345/111 |
| 6,335,818 B1 | 1/2002 | Torres ............ 359/296 |
| 6,570,700 B2 | 5/2003 | Engler et al. ............ 345/107 |
| 6,612,705 B1 * | 9/2003 | Davidson et al. ............ 359/851 |
| 6,730,840 B2 * | 5/2004 | Sasaoka et al. ............ 136/246 |
| 6,738,176 B2 * | 5/2004 | Rabinowitz et al. ............ 359/296 |
| 2002/0131151 A1 | 9/2002 | Engler et al. ............ 359/296 |
| 2003/0192998 A1 | 10/2003 | Davidson et al. ............ 359/850 |
| 2003/0193726 A1 | 10/2003 | Davidson et al. ............ 244/172 |
| 2003/0202235 A1 | 10/2003 | Rabinowitz et al. ............ 359/296 |

* cited by examiner

*Primary Examiner*—Hung Xuan Dang
*Assistant Examiner*—Tuyen Tra (57) ABSTRACT

Due to an ever growing shortage of conventional energy sources, there is an increasingly intense interest in harnessing solar energy. Broadly this invention deals with the general concept of method, apparatus, and consequences of focussing light. Specifically the Coherent-Micro-Macro-Collector of this invention is the unique total solar collector system consisting of concentrator and receiver. Method and apparatus are detailed for systems with: 1. Passive or non-tracking. 2. Semi-Passive tracking 2. Single-axis tracking. 3. Two-axis tracking. Also detailed are means for operating the collector system of micro-optics and receiver on the ground and protection means. A particularly important object of the CMMC is the focussing of sunlight for solar power conversion and production.

28 Claims, 5 Drawing Sheets

ADVANCED MICRO-OPTICS SOLAR ENERGY COLLECTION SYSTEM

The following U.S. patents and allowed patent applications are fully incorporated herein by reference: U.S. Pat. No. 6,612,705 by Mark Davidson and Mario Rabinowitz, "Mini-Optics Solar Energy Concentrator" issued on Sep. 2, 2003. U.S. Publication No. 2003-0202235-A1 by Mario Rabinowitz and Mark Davidson, "Dynamic Multi-Wavelength Switching Ensemble" allowed on Oct. 6, 2003. U.S. Publication No. 2003-0192998 by Mark Davidson and Mario Rabinowitz, "Solar Propulsion Assist" allowed on Nov. 4, 2003.

BACKGROUND OF THE INVENTION

This invention provides a low cost means for achieving affordable solar energy by greatly reducing the cost of solar concentrators which increase (concentrate) the density of solar energy incident on the solar energy converter. A limiting factor in the utilization of solar energy is the high cost of energy converters such as photovoltaic cells. For example, for the purpose of generating electricity, a large area of expensive solar cells may be replaced by a small area of high-grade photovoltaic solar cells operating in conjunction with the inexpensive intelligent mini-optics of this invention. Thus the instant invention can contribute to the goal of achieving environmentally clean energy on a large enough scale to be competitive with conventional energy sources.

Since this invention achieves macroscopic coherent effects by the reflecting mirrors on a microscopic scale, an appropriate name appears to be the Coherent-Micro-Macro-Collector system or simply the acronym CMMC. This term will be used where appropriate in this specification. As used herein (cf. to the Definitions section below) and in prevalent usage, the word Collector commonly refers to the combined system of Concentrator and Receiver.

This invention is less expensive than conventional solar photovoltaic systems for three reasons. First due to miniaturization, the amount of material needed for the concentrating optical system is much less. Second, because the CMMC is light-weight and flexible in geometry, it can easily be attached directly on top of the ground or existing structures. Third because the array of mirrors is micro-miniaturized, tracking the sun is greatly simplified and much less costly compared with conventional tracking concentrators. This is a great economic advantage over all existing solar concentrators which require the construction of a huge separate structure to support them, and a large guidance system with expensive motors and gears to orient them in order to intercept and properly reflect sunlight. Such separate structures must be able to survive gusts, windstorms, earthquakes, etc. The instant invention utilizes the ground directly or existing structures which are already capable of withstanding such inclement vicissitudes of nature.

DEFINITIONS

"Bipolar" refers herein to either a magnetic assemblage with the two poles north and south, or an electric system with + and − charges separated as in an electret.

"Bolometer" is an instrument that can measure the energy of incident electromagnetic radiation in selected wavelength regions by utilizing the change in resistance of a thin conductor caused by the heating effect of the radiation.

"Coherent-Micro-Macro-Collector" or "CMMC" for short, is a solar system for the achievement of macroscopic coherent effects by controlling the microscopic reflecting mirrors.

"Concentrator" as used herein is that part of solar Collector system that directs and concentrates solar radiation onto the Receiver.

"Concentration factor" is < or ~ of the ratio of the area of the concentrator to that of the area of the receiver. It is the factor such as 10×, 100×, etc. by which the solar flux is concentrated at the receiver relative to the ordinary solar flux.

"Dielectric" refers to an insulating material in which an electric field can be sustained with a minimum power dissipation. [Most transparent materials are dielectrics. However Indium/Tin Oxide (also called ITO in the literature) is a conductor that is also transparent.]

"Elastomer" is a material such as synthetic rubber or plastic, which at ordinary temperatures can be stretched substantially under low stress, and upon immediate release of the stress, will return with force to approximately its original length.

"Electret" refers to a solid dielectric possessing persistent electric polarization, by virtue of a long time constant for decay of charge separation.

"Electrophoresis or Electrophoretic" is an electrochemical process in which colloidal particles or macromolecules with a net electric charge migrate in a solution under the influence of an electric current. It is also known as cataphoresis.

"Focussing planar mirror" is a thin almost planar mirror constructed with stepped varying angles so as to have the optical properties of a much thicker concave (or convex) mirror. It can heuristically be thought of somewhat as the projection of thin equi-angular segments of small portions of a thick mirror upon a planar surface. It is a focusing planar reflecting surface much like a planar Fresnel lens is a focusing transmitting surface. If a shiny metal coating is placed on a Fresnel lens it can act as a Fresnel reflector.

"Heliostat" denotes a clock-driven mounting for automatically and continuously pointing apparatus in the direction of the sun.

"Immiscible" herein refers to two fluids which are incapable of mixing.

"Monopolar" as used herein denotes mono-charged optical elements that are controlled in the non-gyricon mode such as the electrophoretic mode.

"Photovoltaic" refers to the production of a voltage in a nonhomogeneous semiconductor, such as silicon, by the absorption of electromagnetic radiation such as light. A photovoltaic cell consists of an np junction between an n-type material and a p-type material. In the n-type material, conduction is due to electrons. In the p-type material, conduction is due to positive holes. The released charge flows as current in an external circuit without the need for a battery. If the external circuit is broken, an open-circuit photovoltage appears at the break which depends on the incident radiation. A similar effect occurs in some complex electrolytic systems.

"Pyramid" as used herein refers to a solar collection system in the form of a large base (area) concentrator with at least three sides and a smaller area receiver above the base.

"Receiver" as used herein denotes any device for the conversion of solar energy into more conveniently usable energy such as electricity. The term "collector" has sometimes been used interchangeably with the term "receiver." Commonly the designation "collector" is reserved for the total system of receiver and concentrator.

"Thermoplastic" refers to materials with a molecular structure that will soften when heated and harden when cooled. This includes materials such as vinyls, nylons, elastomers, fuorocarbons, polyethylenes, styrene, acrylics, cellulosics, etc.

"Thermistor" is a resistor having a high negative temperature coefficient of resistance, so that its resistance decreases as the temperature increases. It is a stable, compact, and rugged two terminal ceramiclike semiconductor that can be easily obtained in the form of a tiny bead, rod, or disk.

"Thermopile" is an array of thermocouples connected either in series to give higher voltage output or in parallel to give higher current output, used for measuring temperature or radiant energy.

"Wand" herein refers to either an electrosatic or magnetic probe for addressing and orienting mirrored elements that have electric or magnetic moments in a semi-passive concentrator. The elements may be addressed and oriented individually or collectively in groups.

SUMMARY OF THE INVENTION

There are many objects and applications of this invention. Broadly this invention deals with the general concept of method, apparatus, and consequences of focussing light. Specifically the Coherent-Micro-Macro-Collector of this invention is the unique total solar collector system consisting of concentrator and receiver. A particularly important object of the CMMC is the focussing of sunlight for power conversion and production. Accordingly, other aspects and advantages are given below.

It is a general aspect of this invention to provide a focussing planar CMMC system for reflecting light with a substantially higher power density than the incident light.

One aspect is to provide an inexpensive, light-weight, and flexible CMMC that can easily be attached directly on top of the ground or existing structures, and thus does not require the construction of a superstructure of its own.

One aspect is to provide an inexpensive, light-weight, and flexible CMMC that can easily be attached to existing structures, and thus does not require the construction of a superstructure of its own.

Another aspect is to provide a solar energy conversion system that is not only low capital cost, but that is also inexpensive to install.

A particularly important aspect is to provide a unique tracking and focussing system for solar power conversion.

Another aspect is to provide enhanced natural convective cooling of a solar photovoltaic receiver to enable it to efficiently cope with the increased solar flux that the concentrator transmits to it.

Another aspect is to utilize the waste heat generated at the receiver for auxiliary purposes such as for domicile hot water usage, heating swimming pools, or as a heat source for industrial processes.

Another aspect is to provide safety mechanisms since the potentially high concentrations of radiant flux have the possibility of being hazardous.

Another aspect is to provide the options of passive, single-axis tracking, or two-axis tracking by the concentrator micro-mirrors to adapt to the varying needs of different applications.

Another aspect is to incorporate methods of exercising or breaking in the rotational micro-mirrors so as to minimize frictional problems.

Another aspect is to provide a system that holds or locks the mini-mirror elements in rigid orientation with minimal to no-power expenditure between rotational focussing operations.

Another aspect is to provide a means for unlocking the mini-mirror elements so that they may rotate freely when being guided into the proper orientation.

Another aspect is to provide an inexpensive system for photovoltaic conversion.

Another aspect is to provide daily peaking power when the load is highest on the conventional power grid.

Another aspect is to provide electricity to remote villages or rural settlements.

Another aspect is to provide a rugged system for conversion of solar energy to heat.

Another aspect is to provide electricity for both mobile and stationary communications systems.

Another aspect is to provide large-scale environmentally clean energy.

Another aspect is to help in the industrialization of developing countries.

Another aspect is to provide a low-cost, tough, light-weight, concentrated efficient solar energy converter that is highly portable.

Another aspect is to provide a minitiarized planar heliostat field configuration that can either track the sun temporally, or follow the sun with a photomultiplier which searches for a maximum output.

Another aspect is to provide a portable system that can easily go anywhere man can go, to track and concentrate the sun's energy.

Other aspects, objects and advantages of the invention will be apparent in a description of specific embodiments thereof, given by way of example only, to enable one skilled in the art to readily practice the invention as described hereinafter with reference to the accompanying drawings.

In accordance with the illustrated preferred embodiments, method and apparatus are presented that are capable of maintaining a high concentration of light relative to the original source such as sunlight. The various embodiments are capable of producing readily utilizable power and energy for human endeavors.

DETAILED DESCRIPTION OF THE PRESENTLY PREFERRED EMBODIMENTS

Figure 1:
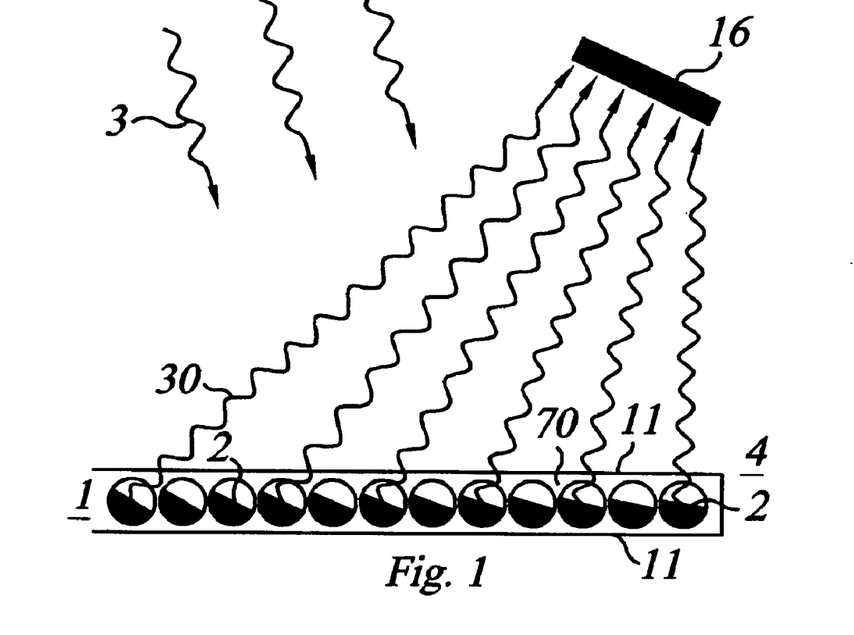
FIG. 1 is a cross-sectional view of an ensemble of rotatable micro-mirrors which are constituents of a micro-optics concentrator which together with a receiver form a unique solar collection system.

FIG. 1 is a cross-sectional view of an ensemble of rotatable elements 1, each with a micro-mirror surface 2 to reflect the incident sunlight 3 as focussed concentrated light 30 to a receiver 16. The aggregate of the elements 1 together with their containment sheets 11, fluid 70, and addressing system are herein referred to as a micro-optics concentrator 4. The inventor of this instant invention is the co-inventor of U.S. Pat. No. 6,612,705, in which the micro-optics concentrator 4 is described in detail. The combination of the micro-optics concentrator 4 and receiver 16 forms a unique solar collection system. The orientation of the mirrored rotatable elements 1 can be achieved by electric fields, magnetic fields, electromagnetically, electrophoretically, magnetophoretically, etc. Since there is great advantage both from the response to the applied torque, and to the reduction in materials costs by making the rotatable miniature reflectors i.e. the mirrored rotatable elements 1 small, a preferable range in diameter is from 4 microns to 100 microns, though smaller and larger diameters will also work well. Much of this is described in U.S. Pat. No. 6,612,705, and thus will not be detailed herein.

Examples of materials that are appropriate dielectrics for making or coating the elements 1 are: acrylic polymers made from acrylic derivatives such as acrylic acid, methacrylic acid, ethyl acrylate, and methyl acrylate; glass, castor wax, carnuba wax, polyethylene, polyester, and other plastics. A conducting, but highly resistive material like Indium/Tin Oxide (ITO) can be sputtered on the sheets 11 to form the addressing system. The optically transparency of ITO makes it ideally suited for addressing the balls.

Figure 2:
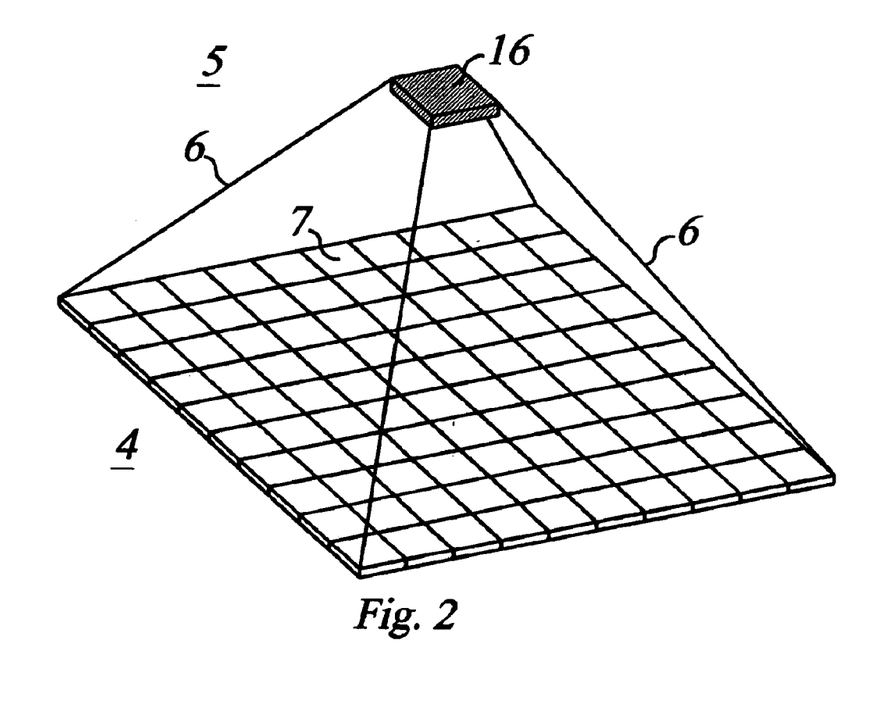
FIG. 2 is a perspective view of a pyramid configuration solar collection system.

FIG. 2 is a perspective view of a pyramidal configuration solar collection system 5 consisting of a flexible micro-optics concentrator 4 and receiver 16 above it, supported by rods 6. When the receiver 16 is a solar photovoltaic receiver, the rods 16 can serve as conduits for electrical wiring to and from the receiver 16. The micro-optics concentrator 4 may be a single large monolitic configuration, or as shown, it is preferably made up of separate modules 7 which are fastened together and secured to an existing surface such as the grourd. This facilitates maintenance and repair operations when needed. Thus it is only necessary to remove one or more modules that need to be worked on, rather than disabling the entire micro-optics concentrator 4. The ensemble of mirror elements 1 and confining sheets may be replaced, while retaining the addressing electronics system. Furthermore this modular design also allows the concentrator 4 to be built up easily to increase the concentration factor. Another advantage of this modular design is that the separate modules 7 can be much more easily transported from the factory to the installation site, than would a large monolithic concentrator.

The micro-optics concentrator 4 may be secured to the ground or any existing structure such as a roof, side of a building, etc. The pyramidal solar collection system 5 is a preferred embodiment when the concentration factor is roughly > 10× and substantial forces of nature such as storms and earthquakes may be encountered. The receiver 16 is perched approximately above the center of the concentrator, with the rods making a roughly 45 degree angle with respect to the concentrator. This is an approximately desirable position and angle, but not critical.

Figure 3:
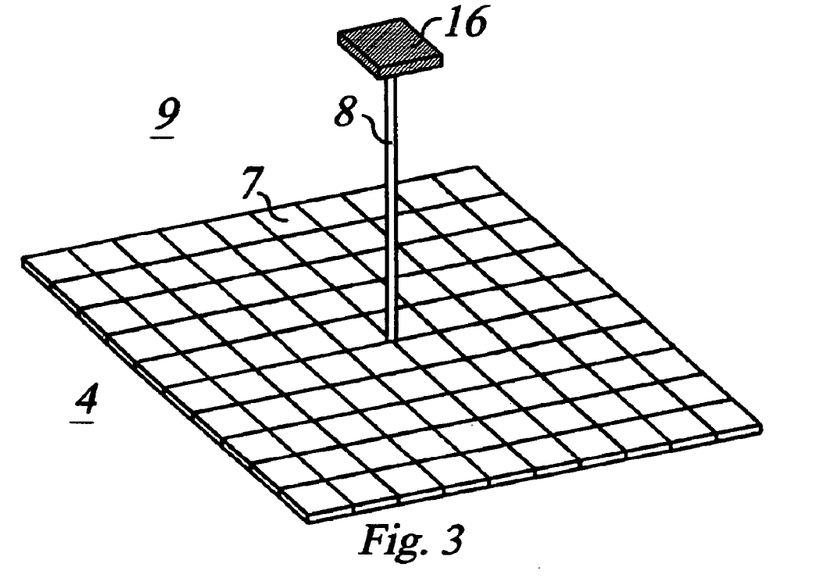
FIG. 3 is a perspective view of a tower configuration solar collection system.

FIG. 3 is a perspective view of a tower configuration solar collection system 9 consisting of a micro-optics concentrator 4 and receiver 16 mounted on a pole 8. When the receiver 16 is a solar photvoltaic receiver, the pole 8 can serve double duty to advantage as both a receiver support and conduit for electrical wiring to and from the receiver 16. This tower configuration is simpler and less expensive than the pyramid configuration, and is preferable when the expected forces of nature are less substantial and the concentration factor is roughly >10×. As with the shown pyramidal configuration, the receiver is above the center of the micro-optics concentrator 4, positioned at a height about equal to that of ½ the concentrator 4 diagonal length making an approximately 45 degree angle from it to the corners of the concentrator 4.

Figure 4:
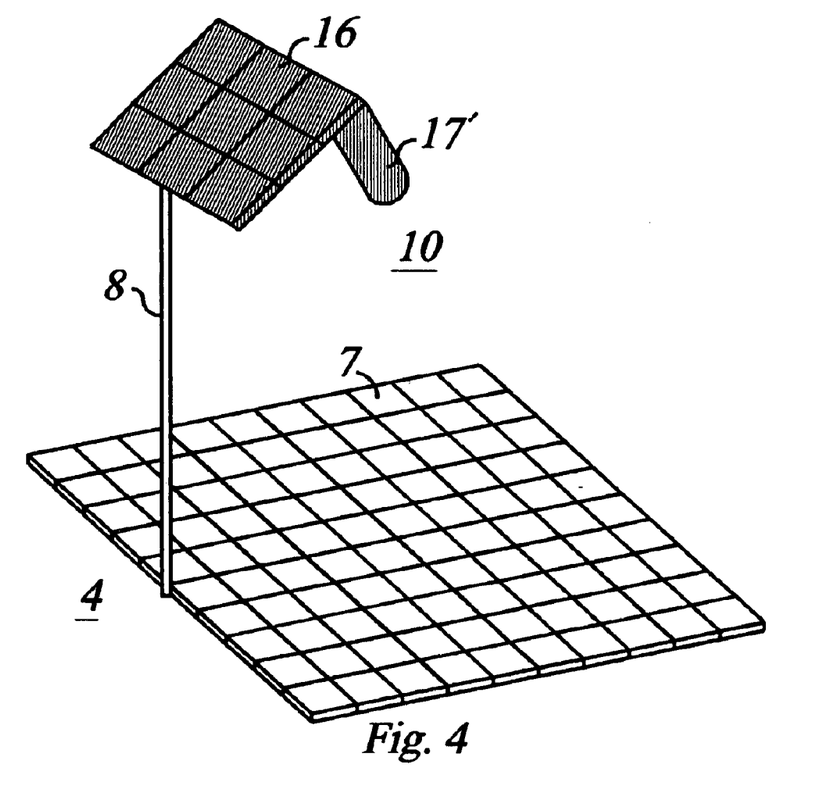
FIG. 4 is a perspective view of a light pole configuration solar collection system also showing a fiducializing sensor.

FIG. 4 is a perspective view of a light pole configuration solar collection system 10 consisting of a micro-optics concentrator 4 and receiver 16 mounted on a pole 8 at one end of the concentrator 4. When the concentration factor is roughly <10×, it is desirable to position the receiver 16 away from over the center of the concentrator 4 to eliminate or reduce the shadow the receiver 16 casts over the concentrator 4, as shown in conjunction with this FIG. 4. Also shown is a fiducializing sensor 17.

The flexible micro-optics concentrator 4 can easily have a proper calibration of the ensemble of rotatable elements 1 on any surface. An approximate calibration may be done at the factory using GPS (Global Positioning Satellite) input related to the final placement site and orientation, with in-situ fine tuning at the installation location. Preferably with the sun overhead on a clear day, the orientation of the balls can be adjusted to maximize the power output of the receiver. For example a fiducializing sensor 17 such as a photomultiplier can be attached to the receiver and used to increase sensitivity to the reflected light signal by means of positive feedback. Thus a flexible concentrator 4 may be laid on an uneven ground, the collective orientation of the mirrors 2 fiducialized so that they can then track the sun in a relatively coherent fashion. This is why I have dubbed this collective coherent tracking and focussing to the receiver, the Coherent-Micro-Macro-Collector system or simply CMMC. The fiducializing sensor 17 or just the receiver 16 can be used on cloudy days to find that orientation of the mirrors that maximizes the receiver 16 output.

The balls may be individually oriented, or groups of balls may be collectively oriented to simplify tracking and focussing. When groups are collectively oriented, as a group they may have a projected group concavity to aid in the focussing to the receiver. Thereafter, the reflecting mirror surface of the balls can concurrently track the sun.

Figure 5:
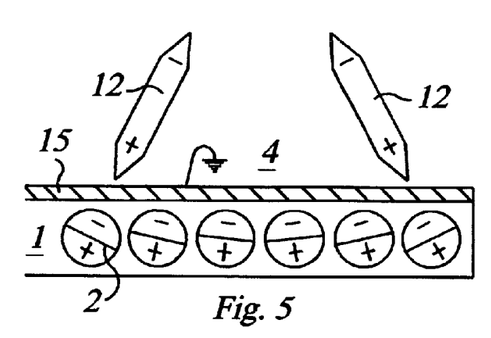
FIG. 5 is a cross-sectional view of a semi-passive micro-optics concentrator with an electrostatic wand. Without the wand it would be a passive micro-optics concentrator.

FIG. 5 is a cross-sectional view of an ensemble of rotatable elements 1 each with a micro-mirror surface 2 as constituents of a micro-optics concentrator 4. This micro-optics concentrator 4 is semi-passive because it does not have an addressing grid to rotate the mirrors for tracking and focussing. Instead an electrosatic wand 12 is used for addressing and orienting the mirrored elements that each have an electric moment in this semi-passive concentrator. A voltage source (not shown) produces a potential gradient which yields the electrosatic field of the wand 12. The electric dipole moments are shown with the negative pole up and the positive pole down, though the reverse configuration may also be used. The elements may be addressed and oriented individually or collectively in groups. When the electrosatic wand 12 is not used, the mirrors 2 remain in a fixed position and the micro-optics concentrator 4 operates in a passive mode.

The mirrors 2 of the micro-optics concentrator 4 can be positioned for a given location and orientation at the factory using Global Positioning Satellite (GPS) data for this location. Using the electrosatic wand 12, fine tuning may be done at the site if desired, and the concentrator 4 can be left to operate in the passsive mode to focus light on a receiver. As shown, more than one electrosatic wand 12 may be used concurrently in concert to more efficiently achieve focussing of the mirrors 2. If desired in the semi-passive mode, electrosatic wand focussing may be done as often as desired e.g. daily, monthly, quarterly, semi-annually, etc.

If the insulating layer above the balls is not thick enough or otherwise not adequate to isolate the rotatable mirrored elements 1 from the effects of stray charge such as can be generated triboelectrically, these elements 1 can be further made immune from such stray triboelectric effects by placing a transparent conductor 15, over this dielectric layer. An alloy of Indium/Tin Oxide (ITO) can serve as a transparent conductor 15. The electric field of the wand 12 can penetrate the transparent conductor 15 if the RC (resistance times capacitance) of the transparent conductor 15 is high enough.

Figure 6:
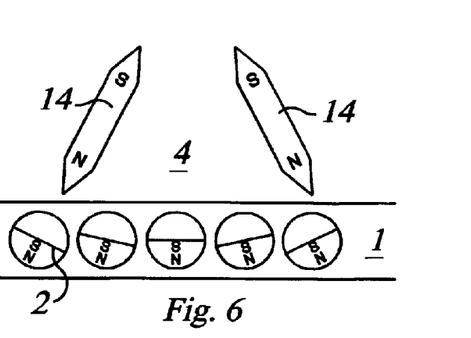
FIG. 6 is a cross-sectional view of a semi-passive micro-optics concentrator with a magnetic wand. Without the wand it would be a passive micro-optics concentrator.

FIG. 6 is a cross-sectional view of an ensemble of rotatable elements 1 each with a micro-mirror surface 2 as constituents of a micro-optics concentrator 4 . This micro-optics concentrator 4 is semi-passive because it does not have an addressing grid to rotate the mirrors for tracking and focussing. Instead a magnetic wand 14 is used for addressing and orienting the mirrored elements that each have an magnetic moment in this semi-passive concentrator. As shown, the magnetic poles in each element are in the lower hemisphere. One magnetic pole may also be in each hemisphere. The magnetic field of the wand 14 can be produced by either a permanent magnet or an electromagnet. The magnetic dipole moments are shown with the south pole up and the north pole down, though the reverse configuration may also be used. The elements may be addressed and oriented individually or collectively in groups. When the magnetic wand 12 is not used, the mirrors 2 remain in a fixed position and the micro-optics concentrator 4 operates in a passive mode.

The mirrors 2 of the micro-optics concentrator 4 can be positioned for a given location and orientation at the factory using Global Positioning Satellite (GPS) data for this location. Using the magnetic wand 12, fine tuning may be done at the site if desired, and the concentrator 4 can be left to operate in the passsive mode to focus light on a receiver. As shown, more than one electrosatic wand 14 may be used concurrently in concert to more efficiently achieve focussing of the mirrors 2. If desired in the semi-passive mode, magnetic wand focussing may be done as often as desired e.g. daily, monthly, quarterly, semi-annually, etc.

The micro-optics concentrator 4 has superior properties to either a Fresnel lens concentrator or a Fresnel mirror concentrator. A Fresnel mirror concentrator can be made by putting a a reflecting metal coating on aFresnel lens. It can heuristically be thought of somewhat as the projection of thin equi-angular segments of small portions of a thick mirror upon a planar surface. It is a focusing planar reflecting surface much like a planar Fresnel lens is a focusing transmitting surface. However, neither a Fresnel lens nor a Fresnel mirror has tracking capability since they are both totally passive. In its simplest form, the micro-optics concentrator 4 of the instant invention has the advantage that it at least be re-focussed with an electrostatic wand 12 or magnetic wand 14 to semi-track the sun. In either its single-axis tracking or its two-axis tracking it is clearly superior to a Fresnel lens or a Fresnel mirror.

OPERATIONAL MODES

The array of reflecting elements 1 may be operated in any of several tracking modes: 1. Passive or non-tracking. 2. Semi-Passive tracking 2. Single-axis tracking. 3. Two-axis tracking. The main utilizaton in the passive mode is for retrofit of existing photovoltac collectors on roofs of homes to increase their output. The main advantage here over other passive concentrator systems is that a separate support structure is not needed-with a concomitant economic benefit. In the passive or non-tracking mode, a concentration enhancement of ~3 to 5 may be easily obtained with a concentrator to receiver area ratio >~10. Without cooling of a solar photovoltaic receiver, this is about a desired level of concentration enhancement for homes-at least for initial retrofit. The semi-passive mode may be used to advantage at a higher concentration level at industrial sites where the concentrator may be laid on the ground. It would thus be more easily accessible than on roofs. Of course, the single-axis tracking mode permits a much greater enhancement for the same concentrator to receiver area ratio. Single-axis tracking can be achieved by either balls or cylinders as the mirrored elements. In addition to operating with a simpler addressing system, single-axis tracking of cylinders permits a higher packing density than can be achieved with balls. Two-axis tracking achieves the greatest enhancement for the same packing density and concentrator to receiver area ratio.

Figure 7:
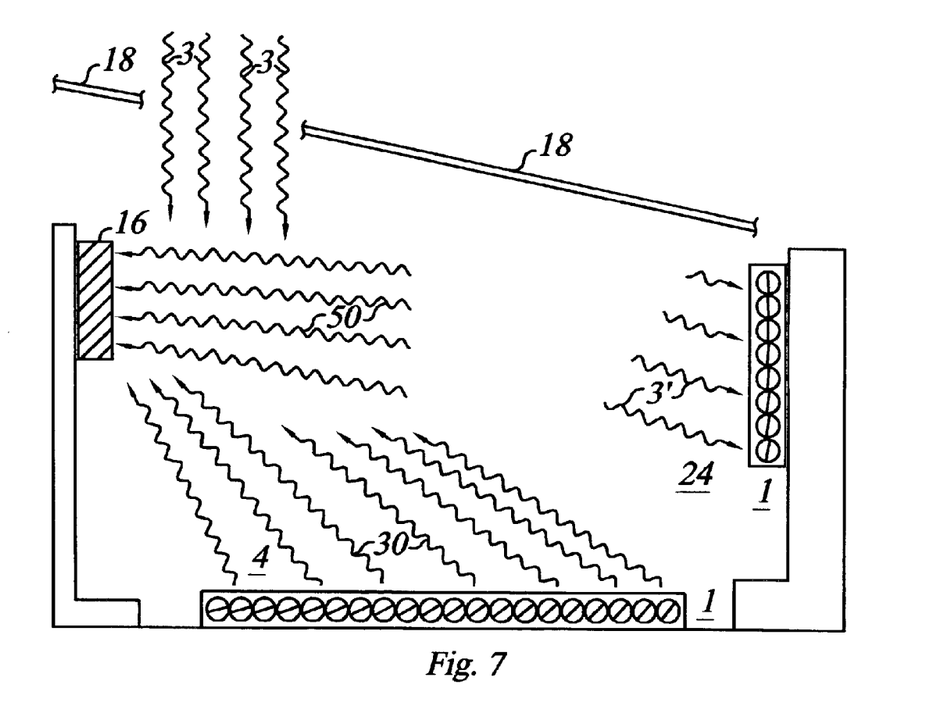
FIG. 7 is a cross-sectional view of a horizonatal micro-optics concentrator used in conjunction with a vertical micro-optics concentrator to more efficiently capture the sun's energy and direct it to a receiver.

FIG. 7 is a cross-sectional view of of an ensemble of rotatable elements 1 in a horizonatal micro-optics concentrator 4 used in conjunction with a vertical micro-optics concentrator 24 to more efficiently capture the sun's energy and direct it to a receiver 16. (Although only one receiver is shown, there may also be more than one receiver, each parallel to a concentrator.)The horizontal micro-optics concentrator 4 may be laid on the ground, while the vertical micro-optics concentrator 24 may be attached to the side of a building. The incident sunlight 3 is shown overhead when it has maximal interaction with the horizonatal concentrator 4, and minimal interaction with the vertical concentrator 24 . The incident sunlight 3' is shown when it is low in the horizon making an acute angle with respect to the earth thus having minimal interaction with the horizonatal concentrator 4, while having maximal interaction with the vertical concentrator 24. Since the concentrator may be sufficiently flexible to bend to roughly a right angle, the same concentrator (or a modular concentrator as shown in FIGS. 2, 3, and 4) may be used for horizontal and vertical interception of the sun's rays. The two (or more, or bent singular) concentrators need not be right angles to each other to have an advantage over a single orientation in better intercepting the sun's rays, though this is a preferred configuration. Another advantage of this multi-angle configuration, is that it helps to get around the problem of shadowing between mirror elements when they are close-packed and the sun's rays are incident on them at glancing angles.

This configuration may be used to advantage where the horizontal concentrator 4, vertical concentrator 2 and receiver 16 are installed in an attic with a transparent roof 18. Such an enclosure will provide protection to the concentrator and receiver surfaces, as would any thin transparent covering with an index of refraction close to 1. When solar energy becomes competitive with other energy sources, installation of solar collector units in attics may be advantageous due to reduction and ease of maintenance.

Though the configuration shown here in FIG. 7 of two roughly mutually perpendicular concentrators superficially looks a bit similar to that of FIG. 12 in U.S. Pat. No. 6,612,705 by Mark Davidson and Mario Rabinowitz, the functionality, operation, and purpose here is considerably different and avoids an unavoidable difficulty inherent in that of the "Multiple Reflection" referred to in that FIG. 12. In the former FIG. 12, the horizontal concentrator focussed sunlight onto the vertical concentrator which reflects and further focusses the sunlight toward the receiver (called a collector therein) to obtain a multiplicative gain in concentrated power. The unavoidable difficulty in that scheme is that if the gain from the horizontal to the vertical concentrator is, let's say 10×, then there will be 10 times as much ultraviolet reaching the vertical concentrator as the normal ultraviolet flux. If the materials in the vertical concentrator start to deteriorate in about 10 years due to ultraviolet light, then the degradation process will be accelerated and they may only last 1 year. In FIG. 7 of the instant invention, both the vertical and horizontal concentrators function to optimize their reflection and focussing of directly incident sunlight to the receiver 16. Thus they are each only exposed to normal ultraviolet flux, with no accelerated deterioration.

Figure 8:
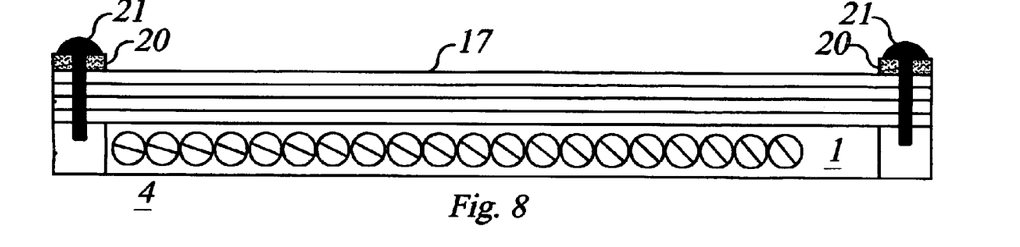
FIG. 8 is a cross-sectional view of a micro-optics concentrator wherein layers of removable plastic film cover and protect it.

FIG. 8 is a cross-sectional view of an ensemble of rotatable elements 1 in a micro-optics concentrator 4. Layers of removable plastic film 17 cover and protect the concentrator 4. The plastic film 17 is held in place by end holder rods 20 which are secured by fasteners 21 placed at least at the four corners of the concentrator 4. In some locales such as deserts, the surface of the concentrator 4 may be expected over a period of time to become covered with dust, dirt, grime, and sand. This would progressively occlude its surface from the sun and degrade its performance. The surface of the concentrator 4 could be swept, vacuumed, and or hosed clean. An advantageous alternative would be to place one or more layers of plastic film 17 over the concentrator 4 so that as they became covered with grime etc., they could progressively be peeled away leaving a fresh, clean, transparent surface with a minimum of maintenance effort. Even having one layer (which would need to be replaced each time) of plastic film 17 over the concentrator 4 would save time, effort, wear, and tear. The disadvantage of such protective layers of plastic film 17, is that they would slightly reduce the transparency and introduce refractive effects if their index of refraction does not match that of the concentrator 4. Both of these effects can be minimized by having the plastic film 17 sufficiently thin. FIG. 8 is not to scale, and for clarity the plastic film 17 is shown relatively much thicker than it would actually be. One layer of plastic film 17 would have negligible negative effect on the optics of the concentrator 4, and great positive effect in those regions where there is a rapid build up of grime. The plastic film 17 may be thought of as being like plastic wrap such as Saran wrap.

The removable plastic film covering of concentrators can ameliorate the problem of enhanced ultraviolet degradation in "Multiple Reflection" concentrators as discussed in conjunction with the description of FIG. 7. As the plastic film degrades, it can be easily replaced periodically. Other solutions to enhanced ultraviolet degradation would be to use silicon-based plastics rather than carbon-based plastics, or to use glass which is hardly affected by the sun's ultraviolet light.

Figure 9:
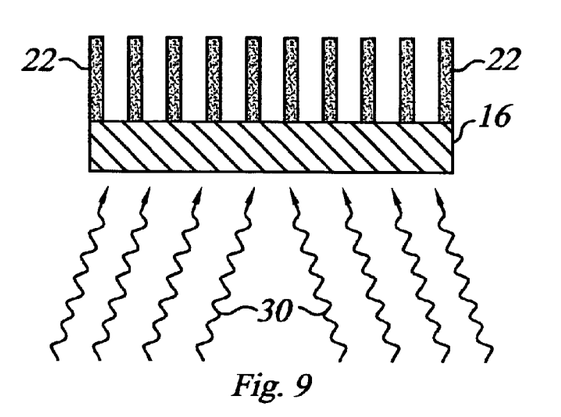
FIG. 9 is a cross-sectional view of a solar receiver, such as a photovoltaic module, showing cooling fins to enhance convective cooling.

FIG. 9 is a cross-sectional view of a solar receiver 16, such as a photovoltaic module, showing cooling fins 22 to enhance convective cooling. Due to the increased solar flux 30 from the previously described micro-optics concentrator, the performance of a solar receiver 16 may be degraded due to heating effects. In many cases the waste heat generated at the receiver 16 could be used for hot water or heating swimming pools, or as a heat source for industrial processes. This could further offset the cost of the system and may even turn the operating and maintenance cost into an operating profit.

When cooling of the receiver 16 by these processes is not possible as in a desert environment which provides much sunlight but no water, an alternative is convective cooling. However unaugmented convective cooling may not be sufficient. In that case, convective cooling may be augmented by placing cooling fins 22 on the receiver 16. The increased area that the cooling fins 22 provide, greatly increases the cooling that can be achieved. The simplicity and low cost of cooling fins 22 have both an economic and practical advantage over forced convection cooling such as would be provided by fans (consuming electrical power), or water flow (if available) over the receiver 16 that serve no other purpose than increased cooling.

Figure 10A:
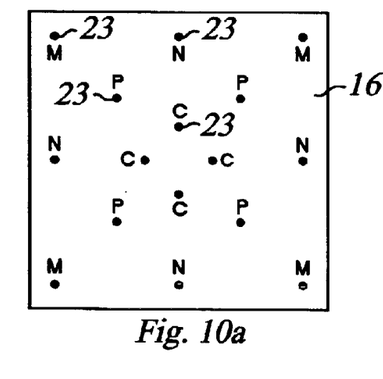
FIG. 10a is a top view of a solar receiver showing placement of thermal radiation detectors over its surface.

FIG. 10a is a top view of a solar receiver 16, with placement of thermal radiation detectors 23 in locations C, M, N, and P as shown. The thermal radiation detectors 23 may be tiny bolometers, photoconductors, photomultipliers, resistors, thermocouples, thermopiles, or thermistors, etc. I have personally obtained excellent results with small Fenwal bead thermistors BC3261 (diameter 0.007 in, and diameter of leads 0.001 in) and GA45JI (diameter 0.04 in and leads 0.004 in). These thermistors were chosen because of their desirable properties of extremely small mass, fast response time, and precision reproducibility. The resistance of the thermistors as a function of temperature was reproducibly determined to better than 0.1 C accuracy by means of a controlled temperature oven and precision wheatstone bridge.

For low concentrations of roughly <10×, no grave danger is posed in those rare instances where the steering system malfunctions, and the mirrors of the micro-optics concentrator miss the receiver 16. However, in the case of high concentrations it is desirable to have a failsafe safety feature built into the micro-optics solar collection system. This is achieved by the system of thermal radiation detectors 23 dispersed over the surface of the receiver 16. If a missteering of the concentrated solar beam should occur, the mirrors are quickly de-focussed so that no harm can result.

Figure 10B:
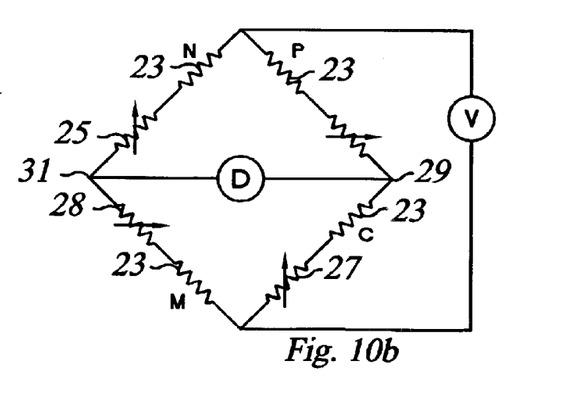
FIG. 10b is a schematic of a bridge circuit to detect mis-steering of the concentrated solar beam.

FIG. 10b is a schematic of a bridge circuit to detect mis-steering of the concentrated solar beam. For specificity the detectors 23 will herein be referred to as thermistors 23. The innermost set C of centrally located thermistors 23 are connected in series with each other and with the variable resistor 27, and are in one leg of the bridge. The set M of thermistors 23 located at the four corners of the concentrator 16 are connected in series with each other and with the variable resistor 28, and are in the leg of the bridge that is in series with the C leg. The set N of thermistors 23 located at the centers of the outer edges are connected in series with each other and with the variable resistor 25, and are in one leg of the bridge. The inner set P thermistors 23 are connected in series with each other and with the variable resistor 26, and are in one leg of the bridge that is in series with the N leg. As shown, the C and M legs of the bridge are in parallel with the N and P legs of the bridge. The variable resistors 25, 26, 27, and 28 are adjusted so that the bridge is balanced in normal operation i.e. the electrical detector D shows no current or voltage difference between the points 29 and 31. Variations of this circuit are also possible.

Some of the beams reflected from the concentrator will hit to the left of center, some to the right, some above and some below center of the receiver 16. On average the incident intensity can be expected to be a Gaussian distribution fitting inside the receiver 16. The Gaussian distribution will have a peak within the innermost central region being monitored by the innermost set C of centrally located thermistors 23. If the reflected beam mis-steers so that the peak intensity moves out of the innermost region, the temperature of this region will fall and the resistance of the C thermistors 23 will rise appreciably. At the same time, the resistance of the P thermistors 23 will fall appreciably causing the bridge to become unbalanced. If the beam moves further over to the edge, a similar unbalance will occur related to temperature and hence resistance changes in the P, M, and N thermistors. In such an occurance, the mirrors can be rapidly randomized to defocus the concentrator in a fail safe mode.

Figure 11A:
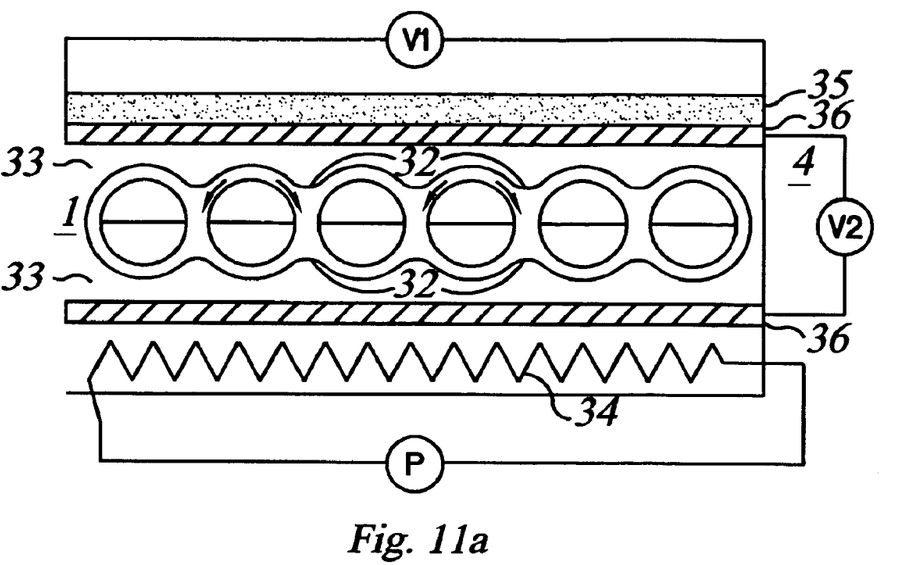
FIG. 11a is a cross-sectional view of apparatus for the training of an ensemble of rotatable mirrored elements in a micro-optics concentrator.

FIG. 11a is a cross-sectional view of apparatus for the training of an ensemble of rotatable mirrored elements 1 in a micro-optics concentrator 4. In order to understand the desirability of training the rotatable mirrored elements 1, let us briefly consider some of the steps that may be taken in the manufacture of a micro-optics concentrator 4. The easiest assembly of the micro-optics concentrator 4 would be to simply confine the mirrored elements 1 between two sheets 32 and seal the sheets 32 together. However, since packing of the elements 1 would be difficult to control it could vary from loose packing to square packing to hexagonal packing which is the most dense. Even though the elements 1 could be aligned, there would be collisions and rubbing between the elements 1, and openings between them would also permit translational motion. Alternatively, a structure of ridged cells 32 can be created in thermoplastic elastomer sheets 33 by heating the sheets 33 to a slightly elevated temperature and applying pressure with the elements 1 between the sheets 32 and then sealing the sheets 32 together. Applying the pressure by drawing a vacuum between the sheets 32 less than the vapor pressure of the lubricating fluid would serve both to form the ridged cells 32 and to degas the surrounding media. Degassing the surrounding media helps prevent air or gas pockets from forming which would cause binding of the elements 1 due to lack of lubrication and buoyant support.

The ridged cells 32 prevent the elements 1 from rubbing together and confine their translational motion. Despite the presence of a lubricating fluid around the balls, there may be unnecessary friction between the elements 1 and the ridged cells 32 due to roughness of both the elements 1 and ridged cells 32. Training is a way of polishing the elements 1 and cells 32 from their mutual interaction to reduce friction and improve performance of the micro-optics concentrator 4. The first step in training is to heat the concentrator 4 by means of the heater 34 which is powered by the power supply P. Heating generally softens most materials and makes it easier to polish them. Furthermore, thermoplastic materials have a molecular structure that will soften when heated and harden when cooled. Temperatures between ½ and ⅔ of the lowest melting or degradation temperature of the materials are desirable. Commonly, temperatures between 35 degrees Centrigrade and 90 degrees Centrigrade may be used. A rough rule of thumb is that the lower the temperature used, the longer is the required training time.

While heat is applied, a vibrator 35 such as a piezoelectric vibrator, operated by voltage source V1 both shakes the elements 1 loose and blunts sharp edges and protrusions. Vibration is preferably in the range no lower than sonic and no higher than the high ultrasonic range.

The next step of cyclically rotating the elements 1 clockwise (cw) and counterclockwise (ccw) at about 1 to 10 Hz is superimposed on the heating and vibration phases of training. This is done by the addressing electrodes 36 which are present in normal operation to track and focus the sun. Tiny particles produced by micro-abrasion during rotation and counter-rotation of the elements at elevated temperature, may simply fall to the bottom of the cells and/or be dissolved in the lubricating fluid that surrounds the balls. If for example a driving voltage V2 of 50 volts is used in the addressing system during normal operation, then ~100 to 150 volts is a desirable voltage during the training phase. The rapid cycling of the elements 1 during training micropolishs both the surface of the elements 1 and the ridged cells 32. Heat facilitates both the micropolishing and the solubility of the abraded material in the the lubricating fluid that surrounding the balls which also acts as a plasticizer and dielectric fluid. Polishing in situ makes the manufacturing process more efficient as it eliminates the step of polishing and then putting elements 1 in the micro-optics concentrator 4.

Figure 11B:
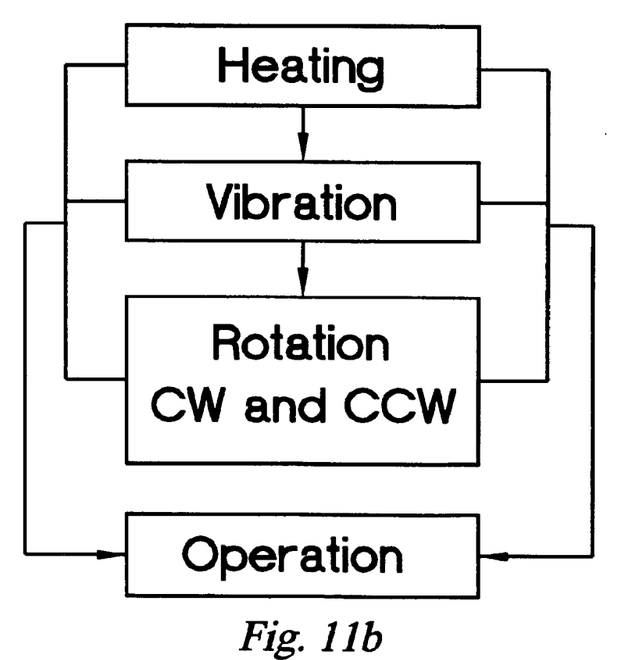
FIG. 11b is a block diagram summarizing the training steps of Heating, Vibration, and CW and CCW Rotation.

FIG. 11b summarizes the training steps of Heating, Vibration, and Clockwise and Counterclockwise Rotation. A smooth interface is created between each element and its cell, which endures after the training is complete with cessation of cycling, vibration, and heating. The total duration of the training is related to temperature elevation, vibrational frequency, and rotational rate of the elements. The necessary level of micropolishing is a function of the particular combination of materials used for the elements, ridged cells, and fluid in which the elements and cells are immersed. One may observe that the elements have a higher rotational rate when the desired level of micropolishing has been achieved, even when the the driving voltage V2 has been reduced. When the combination of the training steps of Heating, Vibration, and Clockwise and Counterclockwise Rotation are completed, the mirco-optics concentrator is operational. Operation is the final goal of training.

While the instant invention has been described with reference to presently preferred and other embodiments, the descriptions are illustrative of the invention and are not to be construed as limiting the invention. Thus, various modifications and applications may occur to those skilled in the art without departing from the true spirit and scope of the invention as summarized by the appended claims together with their full range of equivalents.

What is claimed is:

1. A reflecting micro-optics solar concentrator system which reflects the sun onto a solar energy receiver, comprising:
   a) a solar concentrator with anisotropic rotatable specular reflection miniature mirrors embedded in balls disposed in a surrounding medium of an optically transmissive lubricating fluid disposed behind an optically transmissive surface;
   b) electric coupling means for aligning the anisotropic rotatable miniature specular reflection mirrors;
   c) electrical means for tracking the sun with said mirrors;
   d) means for focusing said reflecting system unto said solar energy receiver; and e) means for supporting said solar energy receiver above said concentrator in a pyramidal configuration.

2. The apparatus of claim 1, wherein said reflecting solar micro-optics concentrator is adjacent to and supported by the ground.

3. The apparatus of claim 1, wherein the said reflecting micro-optics solar concentrator is in modular form.

4. The apparatus of claim 1, wherein the aligning means is at least one external electric field wand.

5. The apparatus of claim 1, wherein the aligning means is at least one external magnetic field wand.

6. The apparatus of claim 1, wherein said optically transmissive surface is covered by a plurality of removable plastic films.

7. The apparatus of claim 1, wherein a plurality of micro-optics solar concentrators are disposed in different angular orientations.

8. The apparatus of claim 1, wherein a plurality of micro-optics solar concentrators and solar energy receivers are each disposed in different angular orientations comprising at least one pair of concentrators and receivers in substantially parallel alignment.

9. The apparatus of claim 1, wherein a plurality of sensors are dispersed on the surface of said solar energy receiver to sense solar beam mis-stearing.

10. The apparatus of claim 1, wherein a plurality of sensors dispersed on the surface of said solar energy receiver to sense solar beam mis-stearing are connected to a circuit for fail-safe defocusing of the solar beam.

11. The apparatus of claim 1, wherein at least one pair of solar concentrators and solar receivers are placed under a transparent cover.

12. A method of concentrating and receiving energy from the sun provided by a solar energy receiver and solar concentrator with miniature mirror reflectors embedded in balls comprising the steps of:
   a) aligning said miniature mirror reflectors;
   b) tracking the sun with said mirrors;
   c) focusing the miniature mirrors unto said solar energy receiver; and
   d) supporting said solar energy receiver above said solar concentrator in a pyramidal configuration.

13. The method of claim 12 further comprising the step of placing the solar micro-optics concentrator on the ground.

14. The method of claim 12 further comprising the step of constructing the solar micro-optics concentrator in modular form.

15. The method of claim 12 further comprising the step of aligning said miniature mirror reflectors by means of an external electric field wand.

16. The method of claim 12 further comprising the step of aligning said miniature mirror reflectors by means of an external magnetic field wand.

17. The method of claim 12 further comprising the step of fiducializing the orientation of the miniature mirror reflectors in situ.

18. The method according to claim 12, wherein the fiducial orientation of the mirrored balls is carried out in situ by means of a fiducializing sensor.

19. A method for improving the alignment operability of rotatable miniature reflectors of a micro-optics solar concentrator system for concentrating reflected sunlight disposed in a surrounding medium of an optically transmissive lubricating fluid retained between upper and lower sheets, the lubricating fluid disposed behind an optically transmissive surface, the method comprising the steps of:
   a) heating the solar concentrator of the micro-optics solar concentrator system for no more than four hours; and
   b) agitating the rotatable miniature reflectors relative to the surrounding media during heating.

20. The method of claim 19 wherein the agitation is provided by vibration of the said micro-optics system.

21. The method of claim 19 wherein the agitation is provided by rotation of the said rotatable miniature reflectors.

22. The method of claim 19, wherein the solar concentrator is heated in the range of 35 to 90 degrees Centigrade.

23. The method according to claim 19, wherein the rotatable miniature reflectors are balls.

24. The method according to claim 19, wherein the rotatable miniature reflectors are generally cylindrical.

25. The method according to claim 19, wherein the rotatable miniature reflectors are electromagnetically anisotropic and wherein the agitating step includes alternating an electromagnetic field and thereby rotating the anisotropic reflectors relative to the surrounding media.

26. The method according to claim 19, wherein an alternating electric field is driven at one to three times the alignment field for the concentrator.

27. The method according to claim 19, wherein an alternating magnetic field is driven at one to three times the alignment field for the concentrator.

28. The method according to claim 19, wherein a manufacturing step includes drawing a vacuum between the sheets so as to degas the medium therein.

* * * * *